United States Patent
Bonaud et al.

(10) Patent No.: US 12,041,121 B2
(45) Date of Patent: Jul. 16, 2024

(54) DEVICES, SYSTEM AND METHOD FOR CHANGING A TOPOLOGY OF A GEOGRAPHICALLY DISTRIBUTED SYSTEM

(71) Applicant: AMADEUS S.A.S., Biot (FR)

(72) Inventors: Jacques Bonaud, Cagnes-sur-Mer (FR); Jean Michel Collomb, Opio (FR); Michel Demazeau, Nice (FR); Thierry Sabran, Antibes (FR)

(73) Assignee: AMADEUS S.A.S., Boit (FR)

( * ) Notice: Subject to any disclaimer, the term of this patent is extended or adjusted under 35 U.S.C. 154(b) by 0 days.

(21) Appl. No.: 17/479,186

(22) Filed: Sep. 20, 2021

(65) Prior Publication Data
US 2023/0091267 A1    Mar. 23, 2023

(51) Int. Cl.
*H04L 67/1008* (2022.01)
*H04L 41/08* (2022.01)
(Continued)

(52) U.S. Cl.
CPC ...... *H04L 67/1008* (2013.01); *H04L 41/0883* (2013.01); *H04L 41/12* (2013.01);
(Continued)

(58) Field of Classification Search
CPC . H04L 67/1008; H04L 41/0883; H04L 41/12; H04L 41/147; H04L 67/1012; H04L 67/1023; H04L 67/1097; G06F 9/5088
See application file for complete search history.

(56) References Cited

U.S. PATENT DOCUMENTS 8,175,863 B1    5/2012  Ostermeyer et al.
2013/0268672 A1  10/2013  Justafort et al.
(Continued)

FOREIGN PATENT DOCUMENTS

CN    109104464 A    12/2018

OTHER PUBLICATIONS

Guo, Wei et al. "A data placement strategy based on genetic algorithm in cloud computing platform." 2013 10th Web Information System and Application Conference. IEEE, 2013.
(Continued)

*Primary Examiner* — Thu V Nguyen
*Assistant Examiner* — Ranjan Pant
(74) *Attorney, Agent, or Firm* — PERRY + CURRIER, INC.

(57) ABSTRACT

A device, system and method for changing a topology of a geographically distributed system is provided. One or more computing devices determine resource usage of an initial topology of a geographically distributed system that includes data stored at one or more initial locations and applications, that consume the data, being implemented at the one or more of initial locations. The computing device(s) determine projected resource usage of additional topologies of the geographically distributed system, the additional topologies defining respective locations, different from the one or more initial locations, where respective portions of the data and/or the applications are located. In response to an additional topology having a respective projected resource usage that is less than the resource usage of the initial topology, the computing device(s) control a respective portion of the data and/or the applications to move to the respective locations defined by the additional topology.

13 Claims, 5 Drawing Sheets

(51) Int. Cl.
  *H04L 41/12* (2022.01)
  *H04L 41/147* (2022.01)
  *H04L 67/1012* (2022.01)
  *H04L 67/1023* (2022.01)
  *H04L 67/1097* (2022.01)

(52) U.S. Cl.
  CPC ........ *H04L 41/147* (2013.01); *H04L 67/1012* (2013.01); *H04L 67/1023* (2013.01); *H04L 67/1097* (2013.01)

(56) References Cited

U.S. PATENT DOCUMENTS

| | | | |
|---|---|---|---|
| 2014/0278623 A1* | 9/2014 | Martinez | G06Q 10/06 705/7.12 |
| 2015/0339156 A1* | 11/2015 | Vincent | G06F 9/4856 718/1 |
| 2016/0078361 A1 | 3/2016 | Brueckner et al. | |
| 2018/0018590 A1 | 1/2018 | Szeto et al. | |
| 2018/0060106 A1 | 3/2018 | Madtha et al. | |
| 2018/0152505 A1* | 5/2018 | Averett | H04L 67/1097 |
| 2019/0034740 A1 | 1/2019 | Kwant et al. | |
| 2019/0294934 A1 | 9/2019 | Shestak et al. | |
| 2020/0304571 A1* | 9/2020 | Ranjan | H04L 41/0896 |
| 2021/0029204 A1* | 1/2021 | Bhatnagar | H04L 41/0897 |
| 2021/0035020 A1 | 2/2021 | Boulineau et al. | |
| 2021/0105322 A1* | 4/2021 | Sakashita | H04L 41/0896 |
| 2021/0273858 A1* | 9/2021 | Radovanovic | G06Q 50/06 |

OTHER PUBLICATIONS

Liao, Zhuofan, et al. "Deep learning-based data storage for low latency in data center networks." IEEE Access 7 (2019): 26411-26417.

Van Hung, Tran. "An effective data placement strategy in main-memory database cluster." 2011 Second International Conference on Networking and Distributed Computing. IEEE, 2011.

* cited by examiner

DEVICES, SYSTEM AND METHOD FOR CHANGING A TOPOLOGY OF A GEOGRAPHICALLY DISTRIBUTED SYSTEM

BACKGROUND

Presently, data for different applications may be stored at different geographic locations, and furthermore such applications may be implemented at yet further geographic locations. Hence, for the applications to use the data, the data must be copied and/or transferred between the various geographic locations leading to network resource usage that may be inefficient.

SUMMARY

An aspect of the present specification provides a method comprising: determining, via one or more computing devices, resource usage of an initial topology of a geographically distributed system that includes data stored at one or more initial locations and applications, that consume the data, being implemented at the one or more of initial locations; determining, via the one or more computing devices, respective projected resource usage of one or more additional topologies of the geographically distributed system, the one or more additional topologies defining one or more respective locations, different from the one or more initial locations, where respective portions of one or more of the data and the applications are located; and in response to an additional topology, of the one or more additional topologies, having a respective projected resource usage that is less than the resource usage of the initial topology, controlling, via the one or more computing devices, a respective portion of one or more of the data and the applications to move to the one or more respective locations defined by the additional topology.

The method may further comprise: prior to controlling the respective portion of one or more of the data and the applications to move to the one or more respective locations, providing a recommendation of the additional topology, and wherein controlling the respective portion to move may occur in response to receiving an acceptance of the additional topology.

The respective projected resource usage of the one or more additional topologies may include resource usage to move the respective portions of one or more of the data and the applications from the one or more initial locations to the one or more respective locations.

The respective projected resource usage of the one or more additional topologies may include: a respective resource usage estimation that estimates, for a given time period, respective resource usage of resources of the geographically distributed system for a respective additional topology; and a respective migration resource usage estimation that estimates respective resource usage to move respective portions of one or more of the data and the applications from the one or more initial locations to the one or more respective locations.

The respective projected resource usage of the one or more additional topologies may include: respective resource usage estimation that estimates, for a given time period, respective resource usage of resources of the geographically distributed system for a respective additional topology; a respective migration resource usage estimation that estimates respective resource usage to move respective portions of one or more of the data and the applications from the one or more initial locations to the one or more respective locations; and an adjustment factor to adjust the respective migration resource usage estimation, relative to the respective resource usage.

The method may further comprise determining that the additional topology has a minimum resource usage, relative to other additional topologies, of the one or more additional topologies, and the initial topology.

The method may further comprise selecting the additional topology using one or more of: a gradient descent process; and an optimization algorithm for finding a local minimum of a differentiable function.

A portion of the one or more additional topologies may be constrained by one or more of: latency rules; data production rules; and location-specific rules.

The respective projected resource usage may be determined with respect to cost thereof.

Determining the resource usage may occur via a resource usage engine that manages data writing and reading requests between the one or more initial locations.

Another aspect of the present specification provides a device comprising a controller configured to: determine resource usage of an initial topology of a geographically distributed system that includes data stored at one or more initial locations and applications, that consume the data, being implemented at the one or more of initial locations; determine respective projected resource usage of one or more additional topologies of the geographically distributed system, the one or more additional topologies defining one or more respective locations, different from the one or more initial locations, where respective portions of one or more of the data and the applications are located; and in response to an additional topology, of the one or more additional topologies, having a respective projected resource usage that is less than the resource usage of the initial topology, control a respective portion of one or more of the data and the applications to move to the one or more respective locations defined by the additional topology.

The controller may be further configured to: prior to controlling the respective portion of one or more of the data and the applications to move to the one or more respective locations, provide a recommendation of the additional topology, and control the respective portion to move in response to receiving an acceptance of the additional topology.

The respective projected resource usage of the one or more additional topologies may include resource usage to move the respective portions of one or more of the data and the applications from the one or more initial locations to the one or more respective locations.

The respective projected resource usage of the one or more additional topologies may include: a respective resource usage estimation that estimates, for a given time period, respective resource usage of resources of the geographically distributed system for a respective additional topology; and a respective migration resource usage estimation that estimates respective resource usage to move respective portions of one or more of the data and the applications from the one or more initial locations to the one or more respective locations.

The respective projected resource usage of the one or more additional topologies may include: respective resource usage estimation that estimates, for a given time period, respective resource usage of resources of the geographically distributed system for a respective additional topology; a respective migration resource usage estimation that estimates respective resource usage to move respective portions of one or more of the data and the applications from the one or more initial locations to the one or more respective locations; and an adjustment factor to adjust the respective migration resource usage estimation, relative to the respective resource usage.

The controller may be further configured to determine that the additional topology has a minimum resource usage, relative to other additional topologies, of the one or more additional topologies, and the initial topology.

The controller may be further configured to select the additional topology using one or more of: a gradient descent process; and an optimization algorithm for finding a local minimum of a differentiable function.

A portion of the one or more additional topologies may be constrained by one or more of: latency rules; data production rules; and location-specific rules.

The respective projected resource usage may be determined with respect to cost thereof.

The controller may be further configured to determine the resource usage occurs via a resource usage engine that manages data writing and reading requests between the one or more initial locations.

BRIEF DESCRIPTIONS OF THE DRAWINGS

For a better understanding of the various examples described herein and to show more clearly how they may be carried into effect, reference will now be made, by way of example only, to the accompanying drawings in which.

DETAILED DESCRIPTION

Presently, data for different applications may be stored at different geographic locations, and furthermore such applications may be implemented at yet further geographic locations. Hence, for the applications to use the data, the data must be copied and/or transferred between the various geographic locations leading to network resource usage that may be inefficient. For example, data may be stored "in the cloud" at various geographic locations, and computing devices (e.g., cloud computing devices), at which application engines (e.g., that implement applications) are located, may be at same or different geographic locations as the data. However, the different locations may alternatively comprise different logically indicated locations (e.g., indicated via network addresses, and the like).

Furthermore, as the application engines "consume" (e.g., use and/or process) the data, more data may be produced and stored, which may be "consumed" by yet further application engines at yet further same or different geographic locations. When data is stored at a different location than an application engine that consumes the data, the data must be copied and/or transferred between respective locations over one or more networks (e.g., such as the internet), leading to network resource usage. Such widely distributed systems may be referred to as geographically distributed systems, and locations of various data sets and application engines may be referred to as a topology. As described herein, different topologies of a geographically distributed system may be more efficient than other topologies and to reduce resource usage, devices, systems and methods described herein are provided, which may change a topology of a geographically distributed system to reduce resource usage.

Figure 1:
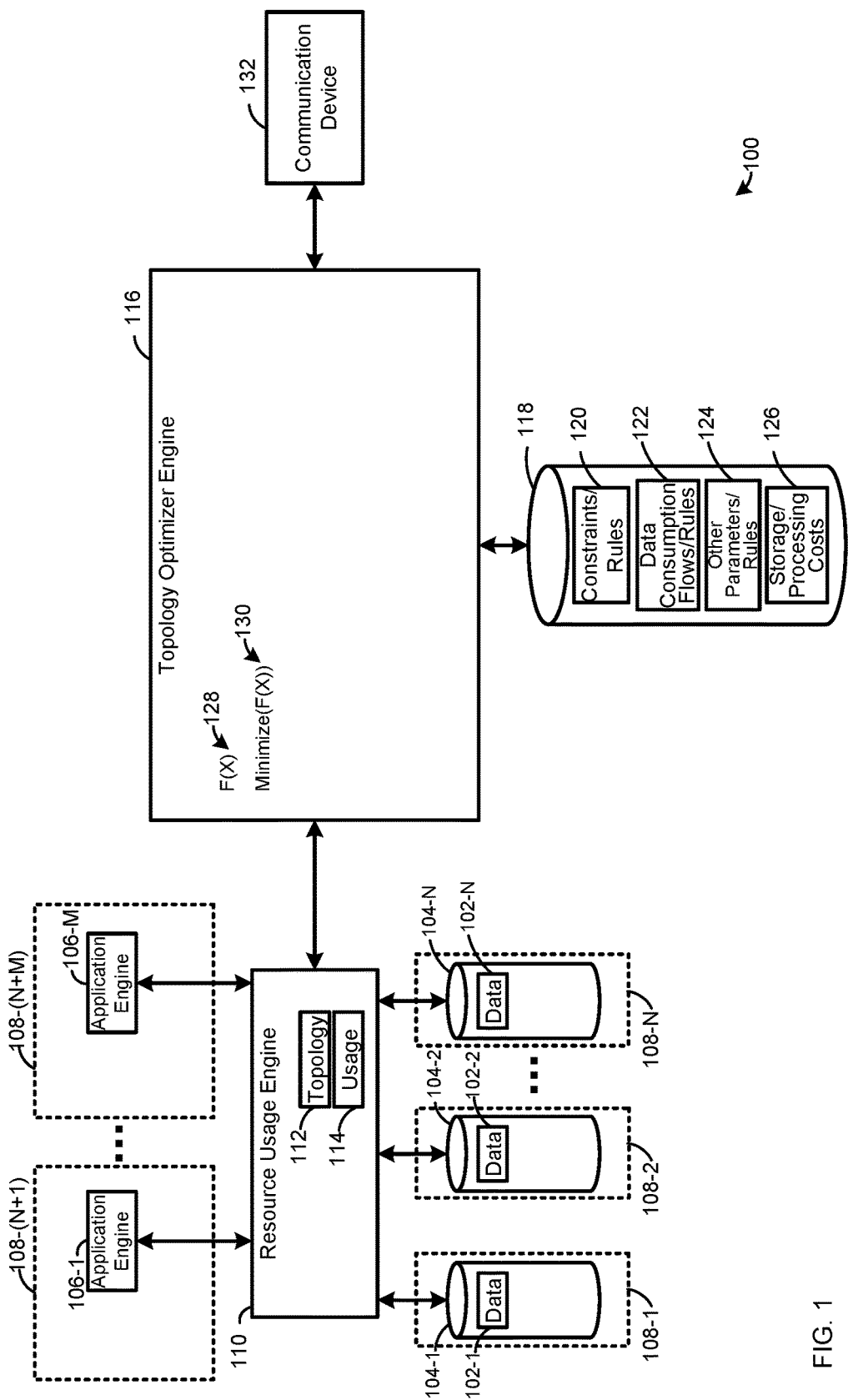
FIG. 1 depicts a system for changing a topology of a geographically distributed system, according to non-limiting examples.

Attention is directed to FIG. 1, which depicts a system 100 for changing a topology of a geographically distributed system.

The components of the system 100 are generally in communication via communication links, which are depicted in FIG. 1, and throughout the present specification, as double-ended arrows between respective components. The communication links includes any suitable combination of wireless and/or wired communication networks and, similarly, the communication links may include any suitable combination of wireless and/or wired links.

The system 100 will furthermore be described with respect to engines. As used herein, the term "engine" refers to hardware (e.g., a processor, such as a central processing unit (CPU), graphics processing unit (GPU), an integrated circuit or other circuitry) or a combination of hardware and software (e.g., programming such as machine- or processor-executable instructions, commands, or code such as firmware, a device driver, programming, object code, etc. as stored on hardware). Hardware includes a hardware element with no software elements such as an application specific integrated circuit (ASIC), a Field Programmable Gate Array (FPGA), a PAL (programmable array logic), a PLA (programmable logic array), a PLD (programmable logic device), etc. A combination of hardware and software includes software hosted at hardware (e.g., a software module that is stored at a processor-readable memory such as random access memory (RAM), a hard-disk or solid-state drive, resistive memory, or optical media such as a digital versatile disc (DVD), and/or implemented or interpreted by a processor), or hardware and software hosted at hardware.

As depicted, the system 100 comprises a plurality of set of data 102-1, 102-2 . . . 102-N stored at a plurality of databases 104-1, 104-2 . . . 104-N, as well as a plurality of application engines 106-1 . . . 106-M. The plurality of sets of data 102-1, 102-2 . . . 102-N are interchangeably referred to hereafter, collectively, as the data 102 and, generically, as a set of data 102 and/or data 102. This convention will be used throughout the present application. For example, the plurality of databases 104-1, 104-2 . . . 104-N may be interchangeably referred to hereafter, collectively, as the databases 104, and generically as a database 104. Similarly, the plurality of application engines, 106-1 . . . 106-M may be interchangeably referred to hereafter as the application engines 106 or an application engine 106.

The data 102 (e.g., and the databases 104) and the application engines 106 are further depicted as being located at respective locations 108-1, 108-1 . . . 108-N . . . 108-(N+ 1) . . . 108-M (e.g., locations 108 and/or a location 108). While depicted as being different from one another, one or more of the locations 108 may be the same. For example, while the data 102-1 (e.g., and the database 104-1) are depicted at the location 108-1, and the application engine 106-1 is depicted at the location 108-(N+1), at least a portion of the data 102-1 may be stored at the location 108-(N+1).

Similarly, while the data 102 and respective databases 104 are depicted such that one set of data 102 and a respective database 104 is located at a respective location 108, more than one set of data 102 and/or more than one database 104 may be located at a given location 108. Similarly, while the application engines 106 are depicted such that one application engine 106 is located at a respective location 108, more than one application engine 106 may be located at a given location 108. Similarly, while the application engines 106 are depicted such that one application engine 106 is located at one respective location 108, implementation of an application engine 106 may be distributed over different locations 108. It is nonetheless understood that at least some of the data 102 is at a different location 108 as an application engine 106, and/or that at least some of the data 102 is stored at different locations 108, and/or that at least two application engines 106 are at different locations 108.

Furthermore, while not depicted, the databases 104 may be implemented by one or more respective computing devices that manage respective databases 104 (e.g., store and retrieve respective data 102 and/or copy respective data 102, and the like).

In some examples, implementation of the databases 104 and/or storage of the data 102 at respective locations 108, and/or implementation of the application engines 106 at respective locations 108, may be provided by one or more cloud service providers. Put another way, an entity associated with the data 102 and/or the application engines 106 may engage one or more cloud service providers to provide storage space and/or processing resources to store the data 102 and/or implement the application engines 106. As such, the one or more cloud service providers may manage scaling of the data 102 and/or the application engines 106 as an amount of the data 102 increases (or decreases) and/or as more (or less) processing resources for implementing the application engines 106 occurs. For example, a number of the application engines 106 may be scaled up (or down) as demand therefor increases (or decreases), with the one or more cloud service providers charging the entity accordingly.

It is further understood that the locations 108 may be generally geographically distributed and hence the system 100 comprises a geographically distributed system. Indeed, hereafter, the system 100 may interchangeably be referred to as the geographically distributed system 100.

However, while the locations 108 are described with respect to different geographic locations, however, it is understood that the locations 108 may be represented logically in the system 100, for example as network addresses, at which data 102 (e.g., and/or respective databases 104) and the application engines 106 are located. Hence, while the locations 108 may be at geographic locations, the term "location" as used herein may refer to network addresses, and the like.

Furthermore, a topology of the system 100 may comprise the locations 108 of the data 102 and the application engines 106. Hence, a topology of the system 100 may comprise a mapping of sets of data 102 and application engines 106 to respective locations 108 and/or network addresses.

Furthermore, the locations 108 of the system 100 of FIG. 1 may initially be referred to as initial locations 108 and/or current locations 108 indicating that the data 102 and/or the application engines 106 are currently and/or initially implemented at such locations 108. Similarly, a topology of the system 100 of FIG. 1 may initially be referred to as an initial topology and/or a current topology.

Furthermore, it is understood that the application engines 106 perform any suitable functionality and/or implement any suitable application, that uses given sets of data 102 as input to generate an output. Hence, hereafter, reference may be made to applications "consuming" the data 102, however it is understood that such applications are implemented by any suitable application engine 106. The term "consuming", and the like, as used herein, is understood to include the application engines 106 using and/or processing data.

In a particular example pertaining to the travel industry, the data 102 may include, but is not limited to, personal name records (PNR) (e.g., of airline customers, and the like), records of bookings (e.g., airline bookings, train bookings, bus bookings, hotel bookings and/or car rental bookings, among other possibilities), records of tickets (e.g., airline tickets, train tickets, and/or bus tickets, among other possibilities), and the like. Furthermore, numbers of such records may be in the millions and/or billions. As such, a number "N" of sets of data 102 may be in the range of hundreds, thousands, millions or higher, with a set of data 102 including hundreds, thousands, millions or higher of records. However, the number "N" may be any suitable number. Furthermore, different set of data 102 may be added to, or removed from, the system 100, at any suitable time and/or in any suitable manner, and hence the number "N" may change over time.

The application engines 106 may perform any suitable functionality and/or analysis on the data 102, including, but not limited to, identifying trends in the travel industry, predicting numbers of future bookings, among other possibilities. While not depicted, results of such analysis may be provided to computing devices in the system 100 being operated by employees, and the like, of the entity associated with the data 102 and/or the application engines 106. As such, a number "M" of application engines 106 may be correspond to any suitable number of application engines 106, and may be in the range of tens, hundreds, thousands, or higher. Furthermore, application engines 106 having similar and/or same functionality may be in different locations 108. As such, the number "M" may be any suitable number. Furthermore, application engines 106 may be added to, or removed from, the system 100, at any suitable time and/or in any suitable manner, and hence the number "M" may change over time.

While such examples pertain to the travel industry, the data 102 and the application engines 106 may comprise any suitable data and applications for any suitable industry.

As previously mentioned, a given set of data 102 and a respective application engine 106 that uses and/or processes and/or consumes the given set of data 102 may be located at different locations 108 leading to a copy of the given set of data 102 being transferred to the respective application engine 106 via a network, such as the Internet, as represented by the various communication links of the system 100. Such a copy of a given set of data 102 to an application engine 106 may be referred to as "writing" the data 102 to an application engine 106. Furthermore, an application engine 106 may initiate writing of the data 102 thereto via a request to "read" the data 102 (e.g., a request for a copy of the data 102). For simplicity, hereafter, reference will be made to transferring data 102 between locations 108 and/or to an application engine 106, though it is understood that such transferring of data 102 may include copying the data 102 rather than moving the data 102.

It is further understood that an application engine 106, when consuming given data 102, may generate more data 102 that may be stored at a database 104, at a same or different location 108 as where the given data 102 is located and/or where the application engine 106 is located. Hence, the data 102 may further include data generated by an application engine 106, which, in turn, may be consumed by another application engine 106 in a same or different location 108. For example, an application engine 106 may implement a subset of a process implemented by a plurality of application engines 106, with intermediate data 102 stored at a database 104. Storing such intermediate data 102 to a database 104 (and/or a location 108) may also be referred to herein as "writing" data.

As depicted, the system 100 further comprises a resource usage engine 110 that generally manages reading requests and data writing between the locations 108. For example, an application engine 106, at one location 108, may transmit a read request for a given set of data 102, located at another location 108, to the resource usage engine 110. The resource usage engine 110 may receive such a read request from such an application engine 106 and initiate writing the given set of data 102 to the application engine 106 that made the read request. The writing of the data 102 to the application engine 106 that made the read request may occur via the resource usage engine 110: for example, the resource usage engine 110 may transfer the data 102 from a respective location 108 to a location 108 of the application engine 106. Alternatively, the writing of the data 102 to the application engine 106 that made the read request may occur without the resource usage engine 110 as an intermediary: for example, the resource usage engine 110 may provide a command that includes the location 108 (e.g., a network address) of the application engine 106 to a computing device operating a database 104, at which the data 102 is stored, and such a computing device may transfer the data 102 to a location 108 of the application engine 106.

It is hence further understood that the resource usage engine 110 generally has access to an initial topology 112 of the system 100 (e.g., a mapping of sets of data 102 and application engines 106 to respective locations 108 and/or network addresses), which may be stored (e.g., as depicted) at the resource usage engine 110, a suitable database 104 and/or one or more databases dedicated to storing an initial topology 112 of the system 100.

However, the resource usage engine 110 is also understood to determine resource usage 114 of an initial topology 112 of the geographically distributed system 100 that includes the data 102 stored at one or more initial locations 108 and applications (e.g., the application engines 106), that consume the data 102, being implemented (e.g., via an application engine 106) at the one or more of initial locations 108.

For example, the resource usage 114 of the initial topology 112 of the geographically distributed system 100, as determined by the resource usage engine 110, may include, but is not limited to, statistics, and the like, on sizes of data 102 consumed by, and/or read by, respective application engines 106, sizes of data 102 generated by, and/or written by, respective application engines 106, and sizes of data 102 stored at respective databases 104.

Alternatively, and/or in addition, in particular examples, the resource usage 114 may include, but is not limited to, respective sizes of sets of data 102 that are read by (and/or written to) respective application engines 106, respective sizes of sets of data 102 that are written by respective application engines 106, locations 108 of the data 102, sizes of data 102 at the locations 108, cost of processing respective sets of data 102 by the application engines 106, and cost of transferring (e.g., reading and/or writing) respective sets of data 102.

Alternatively, and/or in addition, the resource usage 114 may include, but is not limited to, times and/or schedules that application engines 106 consume respective data 102. For example, a given set of the data 102 may change over time (e.g., as travel records and/or bookings change) and an application engine 106 may consume a given set of the data 102 periodically (e.g., to generate daily statistics on travel bookings, and the like).

Alternatively, and/or in addition, the resource usage 114 may include, but is not limited to, statistics, and the, like, of bandwidth used to implement read requests and corresponding writing of data 102 to the locations 108 (e.g., to various application engines 106 and/or by various application engines 106), and/or a processing resources used by the application engines 106 in consuming the data 102 and/or storage sizes of the data 102 at the locations 108, and/or any other suitable usage of resources.

In some examples, the resource usage 114 may be determined with respect to cost of storing the data 102 and/or cost of transferring the data 102 when implementing read requests and corresponding writing of data 102 by respective application engines 106 and/or cost of processing and/or consuming data 102 by respective application engines 106.

Hence, hereafter, while reference may be made to "cost" of performing an action in the system 100 and/or storing data 102 in the system 100, it is understood that such cost is associated with an underlying technical process, such as storing the data 102, transferring the data 102, consuming (e.g., using and/or processing) the data 102, writing the data 102 (e.g., when generated by an application engine 106), and the like.

As will be next be explained, resource usage in transferring given data 102 to a given application engine 106 may be higher when the data 102 and the given application engine 106 are at some locations 108 than at other locations 108.

For example, cost of storing data 102 at a first database 104-1 at a first location 108-1 may be higher than storing data 102 at a second database 104-2 at a second location 108-2.

Similarly, cost of transferring data 102 from a first location 108-1 to a further location 108-(N+1), at which an application engine 106-1 that consumes data 102 is located, may be higher than transferring data 102 from a second location 108-2 to the further location 108-(N+1). Such higher cost may occur as the first location 108-1 and the further location 108-(N+1) may be geographically further apart than the second location 108-2 and the further location 108-(N+1), and hence relatively more network resources may be used in performing a transfer between the locations 108-1, 108-(N+1) than the locations 108-2, 108-(N+1).

Similarly, application engines 106 may be more costly to implement at certain locations 108. For example, computing resources used to implement application engines 106 may be more expensive (and/or more inefficient) at some locations 108 than other locations 108. In a particular example, cost of implementing an application engine 106 at the location 108-(N+1) may be higher than at the location 108-(N+M).

Put another way, topologies of the system 100 that are different from the initial topology 112 may have associated resource usage that is less than the resource usage 114 of the initial topology 112. As such, the system 100 further comprises a topology optimizer engine 116 in communication with the resource usage engine 110. The topology optimizer engine 116 may generally have access to the initial topology 112 and the resource usage 114.

In general, the topology optimizer engine 116 may determine respective projected resource usage of one or more additional topologies of the geographically distributed system 100, the one or more additional topologies defining one or more respective locations 108, different from the one or more initial locations 108, where respective portions of one or more of the data 102 and the application engines 106 are located.

Furthermore, the topology optimizer engine 116 may determine whether an additional topology, of the one or more additional topologies, have a respective projected resource usage that is less than the resource usage 114 of the initial topology 112.

Such an additional topology generally includes data 102, and/or portions thereof, being located at locations 108 that are different from an initial respective location 108, and/or application engines 106, and/or portions thereof, being located at locations 108 that are different from an initial respective location 108. Hence, it is understood herein that data 102 and/or application engines 106 (and/or portions thereof), may be moved between locations 108.

Moving an application engine 106 is understood to include moving functionality of the application engine 106 from being implemented by computing resources at a first location 108 to being implemented by computing resources at a second location 108. Similarly, moving a portion of an application engine 106 is understood to include moving functionality of such a portion of the application engine 106 from being implemented by computing resources at a first location 108 to being implemented by computing resources at a second location 108. Hence, it is understood that functionality of an application engine 06 may be distributed over computing resources at different locations 108.

Put another way, the topology optimizer engine 116 is generally enabled to determine other topologies of the system 100 that may use fewer resources (e.g., bandwidth, storage costs, processing costs) than the initial topology 112. Hence, when an additional topology (e.g., different from the initial topology 112) is determined that has a respective projected resource usage that is less than the resource usage 114 of the initial topology 112, a respective portion of one or more of the data 102 and the application engines 106 may be moved to the one or more respective locations 108 defined by the additional topology.

Furthermore, when a plurality of additional topologies may be determined that use fewer resources than the initial topology 112, an additional topology that uses the least resources may be selected, and a respective portion of one or more of the data 102 and the application engines 106 may be moved to the one or more respective locations 108 defined by the additional topology that uses the least resources.

Hence, in general, the topology optimizer engine 116 attempts to minimize resource usage in the system 100. As will be explained in more detail below, such a minimization may, in some examples, include taking into account resource usage in moving data 102 and/or application engines 106 between locations 108 to implement an additional topology.

When an additional topology is determined that uses fewer resources than the initial topology 112 (e.g., and/or uses a least amount of resources), the topology optimizer engine 116 may transmit a command to the resource usage engine 110 that causes, and/or controls, the resource usage engine 110 to move data 102 and/or application engines 106 (e.g., and/or portions thereof) between locations 108 to implement the additional topology. For example, such a command may indicate which respective portions of the data 102 and/or the application engines 106 are to be moved to given locations 108. Indeed, the command may include a mapping of sets of data 102 and application engines 106 to respective locations 108 and/or network addresses according to the additional topology. The command may further include a time period over which the respective portions of the data 102 and/or the application engines 106 are to be moved to given locations 108, as described in more detail below.

Furthermore, the topology optimizer engine 116 may have access to one or more further databases 118, and the like, which store other data and/or rules 120 that may place constraints on topologies of the system 100. For example, certain jurisdiction, in which data 102 and/or application engine 106 are located may require (e.g., and/or statutorily require, by law, and the like) that certain data 102 and/or processing thereof, must be located within their jurisdictions. In a particular example, for privacy reasons and/or data sovereignty reasons, a given country may require that personal name records of their citizens must be stored and/or processed within the given country. As such, constraints as to locations 108 of such data 102, and/or application engines 106 that consume such data 102, may be placed on topologies of the system 100. As such, the rules 120 may comprise location-specific rules defining such constraints.

Furthermore, the topology optimizer engine 116 may have access to data and/or rules 122 (e.g., stored at the one or more databases 118) indicative of flow of data 102 between the application engines 106. For example, as previously mentioned, a process in the system 100 may be implemented by a plurality of application engines 106 with respective data 102 being transferred between the plurality of application engines 106. An order of implementing functionality at the plurality of application engines 106, and/or an order, in which respective data 102 is written to, and/or written by, the plurality of application engines 106 may be referred to as a data consumption flow, which is indicated in the rules 122. For example, the rules 122 may comprise a list of sets of data 102 and respective application engines 106 that the data 102 is written to, and/or written by, as well as an order thereof. As such, the rules 122 may comprise data production rules that are used by the system 100 to process the data 102 to produce more data by the application engines 106.

However, such data consumption flow data and/or rules 122 may alternatively be indicated by the resource usage 114.

In some examples, when a new application is to be implemented in the system 100, for example by a new application engine 106, a simulation of data flow associated with the new application engine 106 may be determined (e.g., by the topology optimizer engine 116 and/or by another engine in the system 100) and stored at the rules 122.

Furthermore, the topology optimizer engine 116 may have access to other data and/or rules 124 (e.g., stored at the one or more databases 118) indicative of any other further parameters and/or rules that may be use used by the topology optimizer engine 116 in determining additional topologies as described above. For example, changing the system 100 from the initial topology 112 to an additional topology may take time and/or involve cost (e.g., moving data 102 and/or an application engine 106 does not occur instantaneously and furthermore consumes bandwidth, which incurs cost), and the rules 124 may indicate constraints on latency (e.g., time) and/or cost of moving data 102 and/or application engines 106 (e.g., and/or portions thereof) between locations 108. For example, the rules 124 may indicate a maximum latency (e.g., a maximum time) and/or a maximum cost, and the like that is "acceptable" when moving data 102 and/or application engines 106 (e.g., and/or portions thereof) between locations 108. While the term "acceptable" is understood to be a relative term, the rules 124 may be determined heuristically and/or manually and stored at the one or more databases 118 and may indicate specific limits (e.g., a maximum time period and/or a maximum cost, and the like) placed on latency and/or cost of moving data 102 and/or application engines 106 (e.g., and/or portions thereof) between locations 108 when migrating the system 100 to an additional topology. As such, the rules 124 may be referred to as latency rules. However, latency rules may be provided in any suitable manner.

Furthermore, the topology optimizer engine 116 may have access to data 126 (e.g., stored at the one or more databases 118) indicative of storage costs at the databases 104 and/or processing costs of computing resources at the locations 108-(N+1) . . . 108-(N+M). In particular, the databases 104 may be databases operated by one or more cloud service providers and/or the application engines 106 may be implemented by computing resources operated by such one or more cloud service providers. Hence, the data 126 may comprise lists of storage and/or processing costs of such one or more cloud service providers (e.g., for the locations 108, and/or which may be provided jurisdictionally and/or by country, and the like).

Hence, when determining additional topologies for the system 100, the topology optimizer engine 116 may use any suitable combination of the rules 120, 122, 124 and the data 126 to determine the additional topologies and furthermore determine respective projected resource usage of the additional topologies.

For example, topologies that violate the constraints of the rules 120 may be discarded. Furthermore, respective projected resource usage of the additional topologies may be determined using the storage and/or processing costs of the data 102, as well as the data consumption flows of the rules 122. Other parameters of the rules 124 may be used to determine constraints on moving the data 102 and/or application engines 106 (and/or portions thereof) between locations 108.

The topology optimizer engine 116 may use any suitable mechanism for determining whether an additional topology (e.g., different from the initial topology 112) uses fewer resources than the initial topology 112. For example, as also depicted in FIG. 1, the topology optimizer engine 116 may have access to a function 128 (e.g., F(x)) that may be determined for a given additional topology "x", and the function 128 may be dependent on various factors for given additional topologies, such as storage cost of data 102, storage size of data 102, transfer cost of data 102 when transferring to an application engine 106 for consumption, a size of data 102 that is consumed (e.g., transferred) by an application engine 106, an amount of data 102 moved when changing to an additional topology, and/or cost thereof, and the like. Values of the function 128 may be determined for various additional topologies to determine an additional topology that may use fewer resources than the initial topology 112 and/or use a least amount of resources. Indeed, as depicted, the topology optimizer engine 116 may minimize the function 128 in a minimization process 130.

In some examples, the function 128 may be differentiable and the minimization process 130 may be implemented using a gradient decent process The minimization process 130 may include an optimization algorithm for finding a local minimum of the differentiable function 128. For example, such a minimization process may include differentiating the function 128, and selecting an additional topology that corresponds to a local minima of the function 128, within any constraints of the rules 120, 122, 124 and/or the data 126.

In some examples, the minimization process 130 may be constrained with explicit change recommendations and/or parameters, for example as received from an administrator of the system 100, and/or determined heuristically using historical data, to force evaluation of the function 128 towards minimized solutions that may not occur using purely local optimization techniques. The minimization process 130 may further be occur using random topology generation and/or using one or more machine learning algorithms to minimize the function 128. For example, using techniques such as gradient descent process and/or differentiation may result in determination of certain local minima of the function 128, but which may not result in an additional topology that uses a least amount of resources; as such, machine learning techniques and/or historical data and/or heuristic determination of constraining parameters (e.g. parameters which constrain values of "X") and/or random topology generation and/or any other suitable technique may be used to minimize the function 128.

Further details of the function 128 will be described in more detail below with respect to FIG. 4.

As has been previously described, when an additional topology is determined that uses fewer resources than the initial topology 112 (e.g., and/or uses a least amount of resources), the topology optimizer engine 116 may transmit a command to the resource usage engine 110 that causes and/or controls the resource usage engine 110 to move data 102 and/or application engines 106 (e.g., and/or portions thereof) between locations to implement the additional topology. However, in some examples, prior to controlling a respective portion of one or more of the data 102 and the application engines 106 to move to one or more respective locations 108, to implement the additional topology, the topology optimizer engine 116 may provide a recommendation of the additional topology. For example, as depicted, the system 100 further comprises a communication device 132 that may be operated by an administrator of the system 100, and the like. The communication device 132 may include, but is not limited to, a personal computer, a laptop computer, a mobile device, a computer terminal, and the like. In these examples, the topology optimizer engine 116 may provide a recommendation of the additional topology to the communication device 132, for example in the form of a message that includes an indication of the additional topology, a savings of resource usage that may occur if the system 100 changes from the initial topology 112 to the additional topology, and the like.

The communication device 132 may receive the recommendation and, in response transmit an acceptance of the additional topology to the topology optimizer engine 116. For example, the administrator of the system 100 may review the recommendation and, when satisfied that the topology of the system 100 is to change to the additional topology, the administrator may operate the communication device 132 to transmit an acceptance of the recommendation to the topology optimizer engine 116 (e.g., in the form of a message that indicates such acceptance). The topology optimizer engine 116 may receive the acceptance and, control respective portions of the data 102 and/or the application engines 106 to move to implement the additional topology by transmitting the aforementioned command to the resource usage engine 110. Alternatively, the recommendation may be refused, in which case the communication device 132 may transmit a refusal (e.g., in the form of a message) to the topology optimizer engine 116 and the initial topology 112 may be maintained.

In yet further examples, the recommendation may include a plurality of indications of a plurality of additional topologies, and the communication device 132 may be used to select a given one of the plurality of additional topologies, to which the system 100 should change. The topology optimizer engine 116 may receive the acceptance of the given one of the plurality of additional topologies and, control respective portions of the data 102 and/or the application engines 106 to move to implement the given one of the plurality of additional topologies by transmitting the aforementioned command to the resource usage engine 110.

While the system 100 has been described with respect to distinct engines 110, 116 to change the topology of the system 100, the system 100 may include more, or fewer engines than those described. For example, functionality of the engines 110, 116 may be combined into one engine.

Alternatively, functionality of the engines 110, 116 may be divided between more than two engines. For example, functionality of the resource usage engine 110 may be divided between an engine that manages the read requests, and writing of data 102, and an engine that manages changing of a topology of the system 100. Similarly, functionality of the topology optimizer engine 116 may be divided between an engine that generates and/or models different additional topologies, an engine that generates and/or minimizes the function 128, an engine that makes recommendations, and an engine that initiates controlling of the topology to change. Hence, any suitable combination of one or more engines and/or one or more computing devices (e.g., that implement the engines of the system 100), is within the scope of the present specification.

Figure 2:
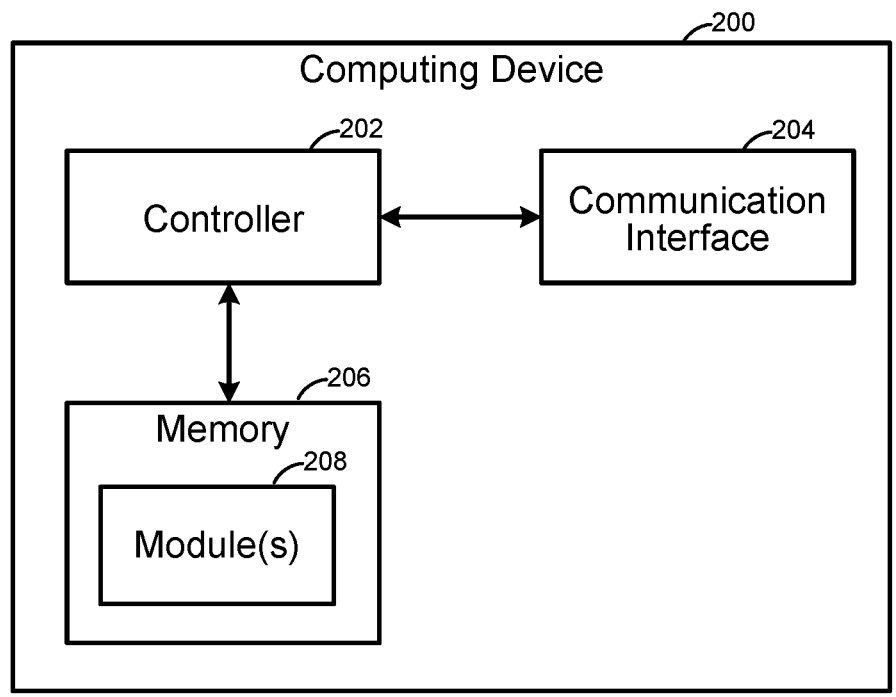
FIG. 2 depicts a computing device of the system of FIG. 1, according to non-limiting examples.

Attention is next directed to FIG. 2, which depicts a block diagram of an example of a computing device 200 that includes a controller 202 communicatively coupled to a memory 204 and a communication interface 206. It is furthermore understood that the computing device 200 may be implemented as one or more servers and/or one or more cloud computing devices, with functionality thereof distributed across one or more servers and/or one or more cloud computing devices. As such, the computing device 200 may be implemented at different cloud computing devices in communication with each other, for example distributed geographically, and which may coordinate implementation of the functionality described herein. For example, the computing device 200, and/or two or more of the computing devices 200, may be used to implement the engines 110, 116 of the system 100. Put another way, functionality of one engine may be at one computing device, or distributed among two or more computing devices. Indeed, the functionality of the engines of the system 100 may be provided in a cloud computing environment.

The controller 202 comprise one or more general-purpose processors and/or one or more special purpose logic devices, such as microprocessors (e.g., a central processing unit, a graphics processing unit, etc.), a digital signal processor, a microcontroller, an ASIC, an FPGA, a PAL, a PLA, a PLD, etc.

The controller 202 is interconnected with the memory 204, which may comprise any suitable memory that stores instructions, for example, as depicted, in the form of applications and/or modules 208 that, when implemented by the controller 202, cause the controller 202 to implement the functionality described herein including, but not limited the engines 110, 116. The memory 204 may be implemented as a suitable non-transitory computer-readable medium (e.g., a suitable combination of non-volatile and volatile memory subsystems including any one or more of Random Access Memory (RAM), read only memory (ROM), Electrically Erasable Programmable Read Only Memory (EEPROM), flash memory, magnetic computer storage, and the like). The controller 202 and the memory 204 may be generally comprised of one or more integrated circuits (ICs).

The controller 202 is also interconnected with a communication interface 206, which generally enables the computing device 200 to communicate with the other components of the system 100 via one or more communication links. The communication interface 206 therefore includes any necessary components (e.g., network interface controllers (NICs), radio units, and the like) to communicate with the other components of the system 100 via one or more communication links (e.g., via one or more communication networks). The specific components of the communication interface 206 may be selected based on upon types of the communication links. The computing device 200 may also include input and output devices connected to the controller 202, such as keyboards, pointing devices, display screens, and the like (not shown).

The memory 204 includes one or more applications and/or modules 208. As used herein, a "module" (in some examples referred to as a "software module") is a set of instructions that when implemented or interpreted by a controller and/or a processor, or stored at a processor-readable medium realizes a component or performs a method.

As depicted, the memory 204 stores one or more modules 208, which corresponds to functionality described below with respect to blocks of a method 300 of FIG. 3. In general, the one or more modules 208, when implemented by the controller 202, may be configured to change the topology of the system 100, and/or provide any other suitable functionality as described herein, as described below with respect to the method of FIG. 3.

While computing resources and/or computing devices that maintain the databases 104 and/or implement the application engines 106 are not described, it is understood that such computing resources and/or computing devices may be similar to the computing device 200, but implemented with applications and/or modules to maintain the databases 104 and/or implement the application engines 106.

Figure 3:
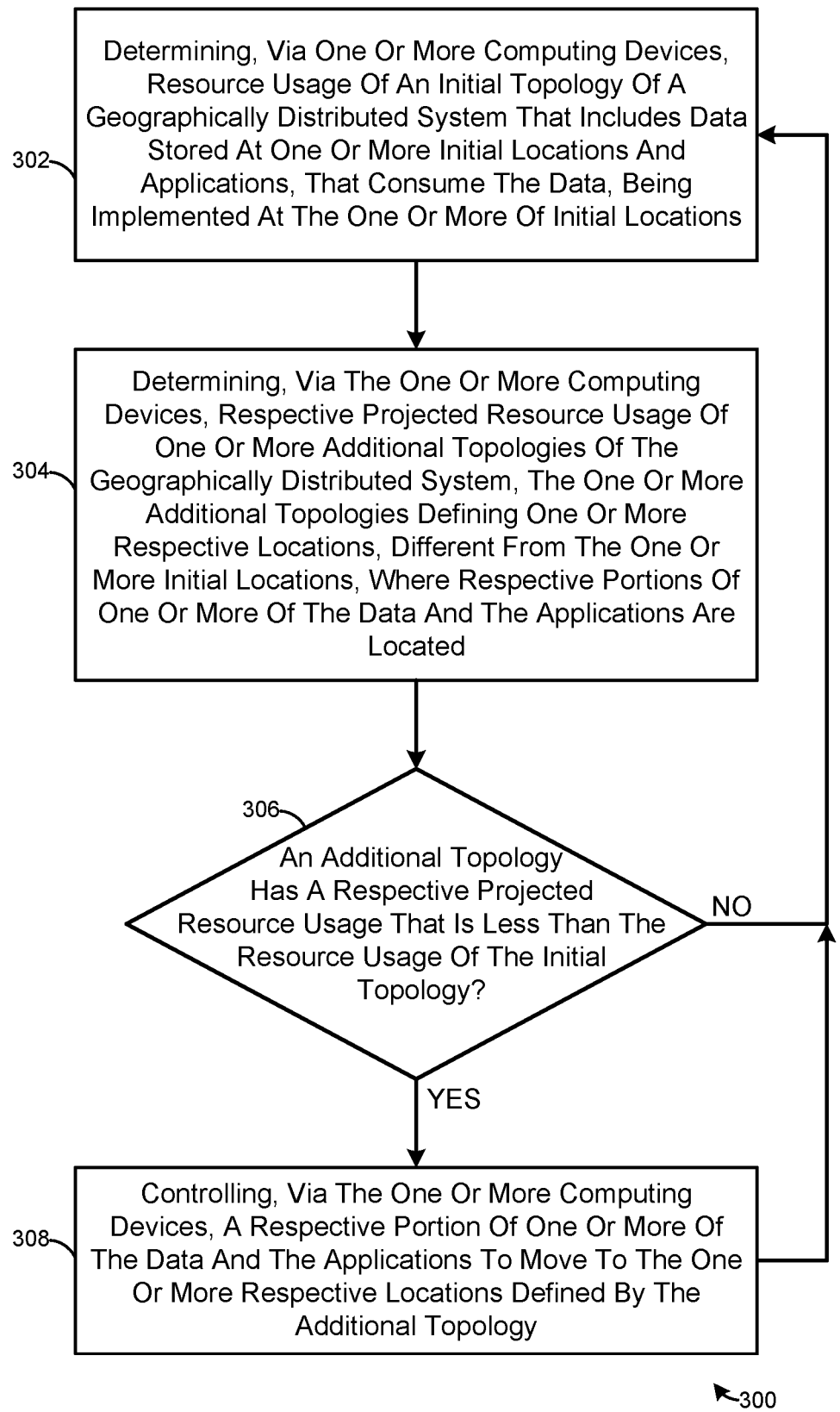
FIG. 3 depicts a method for changing a topology of a geographically distributed system, according to non-limiting examples.

Attention is now directed to FIG. 3, which depicts a flowchart representative of a method 300 for changing a topology of a geographically distributed system. The operations of the method 300 of FIG. 3 correspond to machine readable instructions that are executed by one or more of the computing devices 200 (e.g., and/or by one or more cloud computing devices), and specifically respective controllers 202 of one or more of the computing devices 200 (and/or by controllers of one or more cloud computing devices). In the illustrated example, the instructions represented by the blocks of FIG. 3 may be stored at the memory 204 for example, at least in part as the one or more modules 208. The method 300 of FIG. 3 is one way in which the computing device(s) 200, and/or the controller(s) 202 and/or the system 100 may be configured. However, while the method 300 is specifically described with regards to being implemented by the controller(s) 202 and/or the computing device(s) 200, it is understood that the method 300 may be implemented by one or more cloud computing devices and/or one or more controllers thereof.

Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

Furthermore, hereafter, for simplicity, reference will be made to "applications" that consume the data 102 rather than application engines 106, though it is understood that such applications are implemented via the application engines 106 and/or computing devices and/or computing resources at respective locations 108.

At a block 302, one or more controllers 202 and/or one or more computing devices 200 determine the resource usage 114 of the initial topology 112 of the geographically distributed system 100 that includes the data 102 stored at one or more initial locations 108 and applications, that consume the data 102, being implemented at the one or more of initial locations 108.

In particular, as has been described with respect to FIG. 1, in some examples, determining the resource usage 114 may occurs via the resource usage engine 110 that manages data writing and reading requests between the one or more initial locations 108.

At a block 304, the one or more controllers 202 and/or the one or more computing devices 200 determine respective projected resource usage of one or more additional topologies of the geographically distributed system 100, the one or more additional topologies defining one or more respective locations 108, different from the one or more initial locations 108, where respective portions of one or more of the data 102 and the applications are located.

For example, the one or more controllers 202 and/or the one or more computing devices 200 may generate additional topologies using the rules 120, 122, 124 and/or the data 126 and determine cost and/or resource usage of implementing such additional topologies. Put another way, a portion of the one or more additional topologies may constrained by one or more of: the latency rules 124; the data production rules 122; and the location-specific rules 120.

In a simple example, the one or more controllers 202 and/or the one or more computing devices 200 may, for one additional topology, assume that the data 102-1 is located at a second location 108-2, rather than a first location 108-1 (e.g., where the data 102-1 is located according to the initial topology 112), and determine respective resource usage of such an additional topology.

For example, respective resource usage of such an additional topology may decrease, relative to the resource usage 114, if storage costs are at the second location 108-2 are lower than the first location 108-1, and/or if a cost of transferring and/or writing the data 102-1 from the second location 108-2 to an application engine 106 that consumes the data 102-1, are lower than a cost of transferring and/or writing the data 102-1 from the first location 108-1 to the application engine 106 that consumes the data 102-1.

However, respective resource usage of such an additional topology may increase, relative to the resource usage 114, if storage costs are at the second location 108-2 are higher than the first location 108-1, and/or if a cost of transferring and/or writing the data 102-1 from the second location 108-2 to an application engine 106 that consumes the data 102-1, are higher than a cost of transferring and/or writing the data 102-1 from the first location 108-1 to the application engine 106 that consumes the data 102-1.

More generally, in some examples, the respective projected resource usage of the one or more additional topologies includes: a respective resource usage estimation that estimates (e.g., for a given time period) respective resource usage of resources of the geographically distributed system 100 for a respective additional topology. For example, the respective projected resource usage may include respective daily operation resource usage estimation that estimates respective daily resource usage of resources of the geographically distributed system 100 for a respective additional topology.

In yet further examples, the respective projected resource usage of the one or more additional topologies may include resource usage to move the respective portions of one or more of the data 102 and the applications from the one or more initial locations 108 to the one or more respective locations 108. For example, continuing with the example above, resource usage (e.g., cost) to move the data 102-1 from the first location 108-1 to the second location 108-2 may be determined.

In yet further examples, the respective projected resource usage of the one or more additional topologies may include an adjustment factor to adjust the respective migration resource usage estimation, relative to the respective resource usage (and/or relative to the respective daily operation resource usage), the adjustment factor related to a time period to move the respective portions of one or more of the data 102 and the applications from the one or more initial locations 108 to the one or more respective locations 108. For example, continuing with the example above, the adjustment factor may weight the cost to move the data 102-1 from the first location 108-1 to the second location 108-2 relative to the cost of storing the data 102-1 at the second location 108-2 rather than the first location 108-1.

Indeed, the respective projected resource usage may include various combinations of such factors though, the respective projected resource usage may generally include a respective resource usage estimation that estimates respective resource usage of resources of the geographically distributed system 100 for a respective additional topology. The respective migration resource usage estimation may be optional. When the respective migration resource usage estimation is included, the adjustment factor may be included, or may be optional.

It is yet further understood that respective projected resource usage may be determined with respect to cost thereof.

Details of the respective projected resource usage estimations are described in more detail below with respect to FIG. 4.

At a block 306, the one or more controllers 202 and/or the one or more computing devices 200 determine whether an additional topology, of the one or more additional topologies, has a respective projected resource usage that is less than the resource usage of the initial topology 112. In specific examples, the method 300 may further comprise the one or more controllers 202 and/or the one or more computing devices 200 determining that an additional topology has a minimum resource usage, relative to other additional topologies, of the one or more additional topologies, and the initial topology 112.

In particular, the block 306 may include selecting an additional topology (e.g., that has a respective projected resource usage that is less than the resource usage of the initial topology 112 has a minimum resource usage) using one or more of: a gradient descent process; an optimization algorithm for finding a local minimum of the differentiable function 128, and the like.

Indeed, implementation of the block 304 and the block 306 may occur concurrently. For example, at the block 304, an additional topology may be determined and evaluated at the block 306, for example as to whether the additional topology has a minimum resource usage. Alternatively, the function 128 may be generated at the block 304 and minimized at the block 306. As such, implementation of a gradient descent process and/or an optimization algorithm may occur via concurrent implementation of the block 304 and the block 306.

In response to an additional topology, of the one or more additional topologies, having a respective projected resource usage that is less than the resource usage of the initial topology 112 (and/or the additional topology has a minimum resource usage) (e.g., a "YES" decision at the block 306), at a block 308, the one or more controllers 202 and/or the one or more computing devices 200 control a respective portion of one or more of the data 102 and the applications to move to the one or more respective locations 108 defined by the additional topology.

After the block 308, the one or more controllers 202 and/or the one or more computing devices 200 may continue to implement the method 300 at the block 302.

However, in response to an additional topology, of the one or more additional topologies, not having a respective projected resource usage that is less than the resource usage of the initial topology 112 (e.g., a "NO" decision at the block 306), the one or more controllers 202 and/or the one or more computing devices 200 may continue to implement the method 300 at the block 302. Put another way, when the initial topology 112 has a minimum resource usage compared to the additional topologies, no change to the system 100 occurs.

The method 300 may include any other suitable features and/or blocks.

For example, the method 300 may include, but is not limited to, the one or more controllers 202 and/or the one or more computing devices 200: prior to controlling the respective portion of one or more of the data 102 and the applications to move to the one or more respective locations 108 (e.g., at the block 308), providing a recommendation of the additional topology, and controlling the respective portion to move (e.g., at the block 308) occurs in response to receiving an acceptance of the additional topology. For example, such a recommendation may be transmitted to the communication device 132, which further provide an acceptance to the one or more controllers 202 and/or the one or more computing devices 200.

Furthermore, the method 300 may be implemented periodically, such as week, monthly, and the like, time period of such periodicity may be determined in conjunction with a time period for changing topologies. For example, when a time period for changing topologies is one week (e.g., which may be set by an administrator by the system 100 and/or in any other suitable manner described in more detail below), the method 300 may be implemented monthly. However, when a time period for changing topologies is one day (e.g., which may be set by an administrator by the system 100 and/or in any other suitable manner described in more detail below), the method 300 may be implemented weekly. However, such periodicity may be set and/or determined in any suitable manner including, but not limited to, by an administrator of the system 100.

Figure 4:
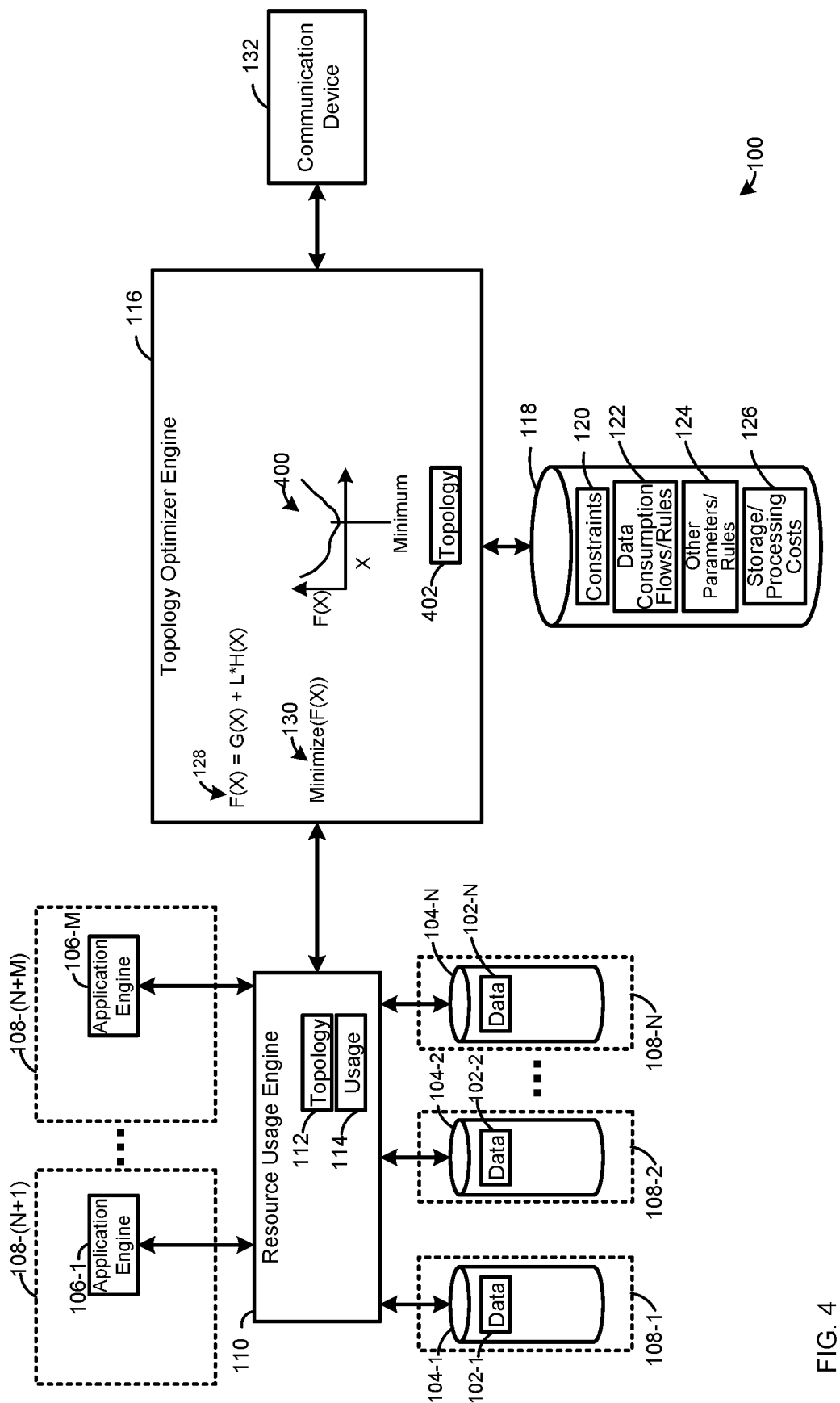
FIG. 4 depicts the system of FIG. 1 determining a topology that has a respective projected resource usage that is less than the resource usage of an initial topology, according to non-limiting examples.
Figure 5:
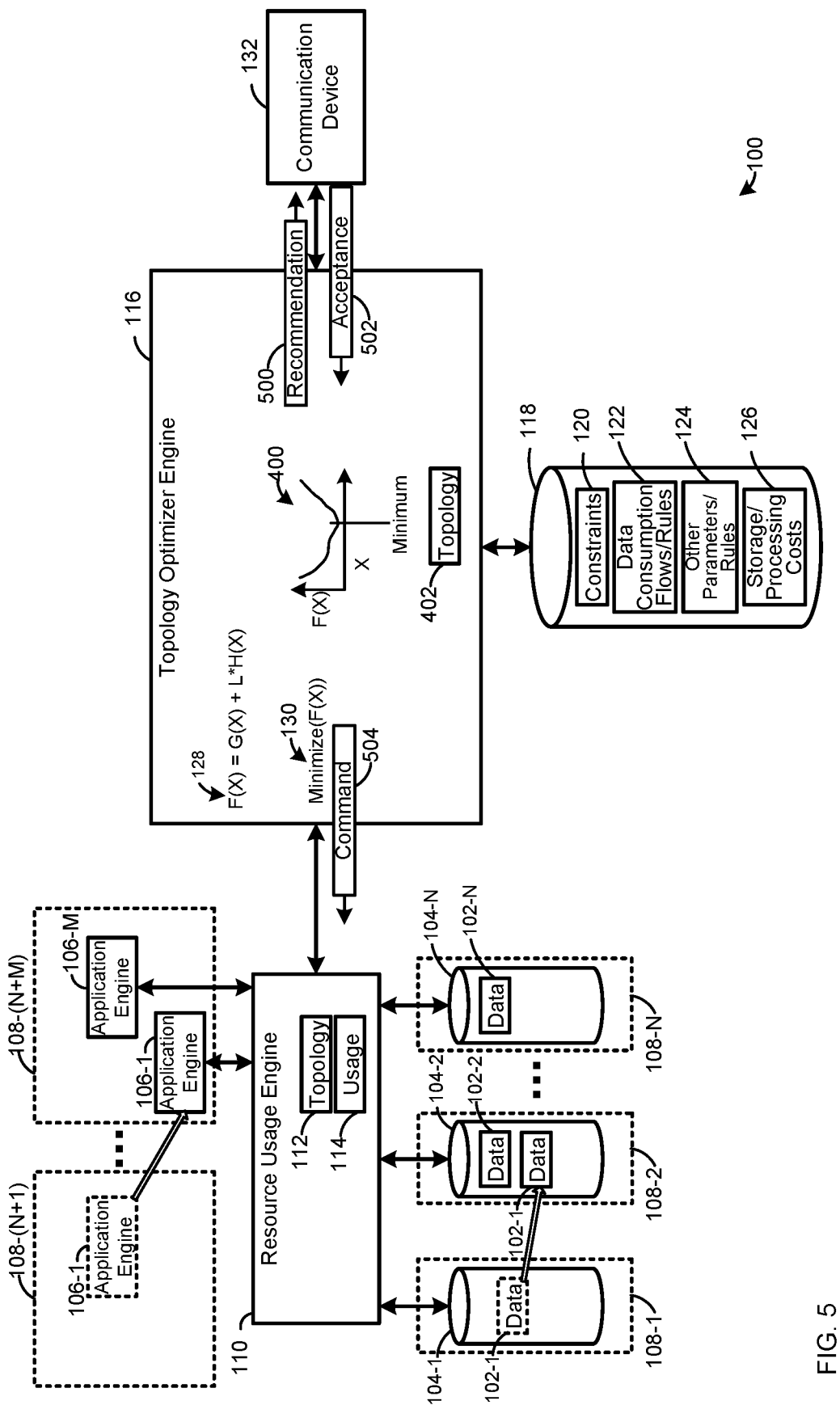
FIG. 5 depicts the system of FIG. 1 changing a topologies, according to non-limiting examples

Attention is next directed to FIG. 4 and FIG. 5, which depicts an example of the method 300. FIG. 4 and FIG. 5 are substantially similar to FIG. 1, with like components having like numbers.

With attention first directed to FIG. 4, an example function 128 is depicted as:

$$F(X)=G(X)+L*H(X) \qquad \text{Equation (1)}$$

In Equation (1), "X" may comprise any set of variables that define topologies, such as locations 108 of data 102 and/or applications (e.g., application engines 106), G(X) may comprise a respective resource usage estimation (e.g., for a given time period, such as weekly, monthly, or any other given time period) for a given topology corresponding to a given set of variables "x" (e.g., given locations 108 of data 102 and/or applications (e.g., application engines 106), H(x) may comprise a respective migration resource usage estimation for the given topology "x", and L may comprise an adjustment factor to adjust the respective migration resource usage estimation, relative to the respective resource usage.

In some examples, for a given topology "x", G(x) may comprise:

$$G(x)=\Sigma(\text{storage cost}*\text{storage size})+\Sigma(\text{transfer cost}*\text{consumed size}) \qquad \text{Equation (2)}$$

In Equation (2), for the given topology, storage cost (e.g., per a unit storage size) at the locations 108 is multiplied by the storage size of data 102 at the locations 108, and summed to determine a total storage cost. Similarly, in Equation (2), transfer cost (e.g., per a unit transfer cost; hence the transfer cost may comprise a per unit bandwidth cost) to transfer data 102 at the locations 108 to respective application engines 106 (e.g., at same or different locations 108) that consume such data 102 is multiplied by the size of data 102 that is consumed at the locations 108 (e.g., for the given topology), and summed to determine a total transfer cost. The total storage cost ($/(storage cost*storage size)$) is summed with the total transfer cost ($\Sigma$(transfer cost*consumed size)) to determine a resource usage estimation for a given topology.

In some examples, for a given topology "x", H(x) may comprise:

$$H(x)=\Sigma(\text{transfer\_cost}*\text{volume\_migrated}) \qquad \text{Equation (3)}$$

In Equation (3), transfer cost (e.g., per unit transfer cost, similar to as in Equation (2)) is multiplied by a volume and/or size of data (e.g., including the data 102 and/or modules of application engines 106) that would be migrated (e.g., moved) between locations 108 to change from the initial topology 112 to the given topology.

Furthermore, "L" generally comprises an adjustment factor that may be varied in Equation (1) for example from "0" to any suitable (positive) value. "L" may be understood to generally represent a weight of the migration resource usage (e.g., as represented by H(X)), relative to the new given topology (e.g., as represented by G(X)) in the overall function F(X) to be minimized. Put another way, "L" is generally related to a time period to amortize transferring data between locations 108 to change to a given topology. For example, the term "amortize" may be used to describe a transfer of data over a time period, as cost of performing a change in topologies occurs over the time period (e.g., data to implement the change may be transferred between locations 108 over such a time period) and cost is hence spread out over the time period.

In general, when "L" is increased, weight of L*H(x) relative to G(x) increases, and more weight is placed on resource usage to change topologies than to the resource usage of a given topology, to which the system 100 is changed. Hence, in these examples, the topology optimizer engine 116 would tend towards a combination of a given topology and a transfer cost that is "amortized" over a shorter time period.

Similarly, when "L" is decreased, weight of L*H(x) relative to G(x) decreases, and more weight is placed on the resource usage of a given topology, to which the system 100 is changed than to resource usage to change topologies. Hence, in these examples, the topology optimizer engine 116 would tend towards a combination of a given topology and a transfer cost that is "amortized" over a longer time period.

In some examples, an administrator of the system 100 may set a value of "L" for example, in the data 126. Alternatively, a value for "L" may be determined heuristically and/or based on historical values for "L" (e.g., which previously resulted in a cost-effective change, and the like) from an initial topology to an additional topology) As such, in these examples, when the function 128 (F(X)) is minimized, the values of "X" may be varied, but the value of "L" may be fixed during the minimization process. Put another way, minimization of F(X) may comprise determining values of "X", for which F(X) is the smallest.

For example, the value of "L" may be set to "1" to place equal weight on resource usage of a given topology, to which the system 100 may be changed and resource usage to change topologies. In another example, the value of "L" may be set to less than "1" to place more weight on resource usage of a given topology, to which the system 100 may be changed than on resource usage to change topologies. In another example, the value of "L" may be set to greater than "1" to place more weight on resource usage to change topologies than resource usage of a given topology, to which the system 100 may be changed. In yet another example, the value of "L" may be set to "0" to remove resource usage to change topologies as factor in determining projected resource usage of a given topology.

It is understood that when L=0, a respective resource usage estimation for a given topology estimates, for a given time period (e.g., daily), respective resource usage of resources of the geographically distributed system for a respective additional topology.

It is further understood that when L=1, a respective resource usage estimation for a given topology includes: a respective resource usage estimation that estimates, for a given time period (e.g., daily), respective resource usage of resources of the geographically distributed system for a respective additional topology; and a respective migration resource usage estimation that estimates respective resource usage to move respective portions of one or more of the data 102 and the applications (e.g., application engines 106) from the one or more initial locations 108 to the one or more respective locations 108.

It is further understood that when L is different from 0 and different from 1, a respective resource usage estimation for a given topology includes: respective resource usage of resources of the geographically distributed system for a respective additional topology; a respective migration resource usage estimation that estimates respective resource usage to move respective portions of one or more of the data 102 and the applications (e.g., application engines 106) from the one or more initial locations 108 to the one or more respective locations 108; and an adjustment factor to adjust the respective migration resource usage estimation, relative to the respective resource usage, the adjustment factor related to a time period to move the respective portions of one or more of the data 102 and the applications (e.g., application engines 106) from the one or more initial locations 108 to the one or more respective locations 108.

As also seen in FIG. 4, the minimization process 130 of the function 128 is indicated graphically in a graph 400, for example, for a variable "X" (e.g., a change in location of the data 102-1 between different locations 108), and a minimum is indicated in the graph 400, showing that, when the data 102-1 is located at a location 108 corresponding to the minimum, a corresponding additional topology 402 uses a least amount of resources compared to when the data 102-1 is located at other locations 108.

While the graph 400 is depicted as continuous, it is understood that in the function 128 (F(X)), X may be discrete as the locations 108 are generally discrete. Hence, the graph 400 is understood merely to represent any suitable minimization process. Furthermore, while the graph 400 is depicted as two-dimensional, it is understood that the function 128 may be a function of a multidimensional variable, with dimensionality of the function 128 depending on numbers of possible locations 108 where the data 102 and/or the application engines 106 may be located and/or moved to. For example, the additional topology 402 may comprise a topology, in which the data 102-1 is moved to the database 104-2 at the location 108-2, and in which the application engine 106-1 is moved to the location 108-(N+M).

Hence, FIG. 4 is understood to provide examples of the block 302 of the method 300, in which the resource usage engine 110 determines the resource usage 114 of the initial topology 112. FIG. 4 is further understood to provide examples of the block 304 and the block 306, in which the topology optimizer engine 116 determines that the additional topology 402, which may be one of a plurality of additional topologies, comprises a topology having a respective projected resource usage that is less than the resource usage 114 of the initial topology 112 and, more specifically, uses a least amount of resources as any of the other plurality of additional topologies.

Attention is next directed to FIG. 5, which depicts an example of the block 308 of the method 300. FIG. 5 continues with the example where the additional topology 402 comprises a topology, in which the data 102-1 is moved to the database 104-2 at the location 108-2, and in which the application engine 106-1 is moved to the location 108-(N+M).

As depicted, the topology optimizer engine 116 transmits a recommendation 500 to the communication device 132 to change the system 100 to the additional topology 402. As depicted, the communication device 132 responds with an acceptance 502 to change the system 100 to the additional topology 402. The topology optimizer engine 116 receives the acceptance 502 and transmits a command 504 to the resource usage engine 110 to change the system 100 to the additional topology 402. In response, the resource usage engine 110 causes the data 102-1 to move from the first location 108-1 (e.g., an initial location 108), at which the data 102-1 is stored to a second location 108-2 (e.g., as indicated by an arrow therebetween and the data 102-1 being depicted in dashed lines at the first location 108-1). The resource usage engine 110 further causes the application engine 106-1 to move from the location 108-(N+1) (e.g., an initial location 108), at which the application engine 106-1 is being implemented, to the location 108-(N+M) (e.g., as indicated by an arrow therebetween and the application engine 106-1 being depicted in dashed lines at the initial location 108-(N+1)).

Such a migration of the data 102-1 and/or the application engine 106-1 may occur over a time period that may be generally indicated by the adjustment factor "L" and/or in any other suitable manner. For example, a suitable fraction of the data 102-1 and/or portions of the application engine 106-1 may be transferred periodically within the time period, and/or continuously over the time period. Furthermore, transfer of the application engine 106-1 may be prioritized to prevent any possible interruptions in functionality of the application engine 106-1 due to the transfer. Furthermore, transfer of the application engine 106-1 may occur by generating a copy of the application engine 106-1 at the location 108-(N+M) and, when such a copy is complete, the application engine 106-1 at the location 108-(N+1) may be deleted. Indeed, a similar transfer process may occur for the data 102-1. The resource usage engine 110 may further track where portions and/or fractions of the data 102-1 and/or the application engine 106-1 are located during the transfer to facilitate reducing and/or eliminating interruptions in processing the data 102-1 and/or implementing the application engine 106-1.

Regardless, it understood that, at least when the transfer is completed, the system 100 will operate using fewer resources (e.g., and/or at lower cost) according to the additional topology 402 than the previously initial topology 112.

As should by now be apparent, the operations and functions of the devices described herein are sufficiently complex as to require their implementation on a computer system, and cannot be performed, as a practical matter, in the human mind. In particular, computing devices, and the lie, such as set forth herein are understood as requiring and providing speed and accuracy and complexity management that are not obtainable by human mental steps, in addition to the inherently digital nature of such operations (e.g., a human mind cannot interface directly with, RAM or other digital storage, cannot change topologies of a system, cannot transmit or receive electronic messages, among other features and functions set forth herein).

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some examples, the terms are understood to be "within 10%," in other examples, "within 5%", in yet further examples, "within 1%", and in yet further examples "within 0.5%".

Persons skilled in the art will appreciate that in some examples, the functionality of devices and/or methods and/or processes described herein can be implemented using pre-programmed hardware or firmware elements (e.g., application specific integrated circuits (ASICs), electrically erasable programmable read-only memories (EEPROMs), etc.), or other related components. In other examples, the functionality of the devices and/or methods and/or processes described herein can be achieved using a computing apparatus that has access to a code memory (not shown), which stores computer-readable program code for operation of the computing apparatus. The computer-readable program code could be stored on a computer readable storage medium, which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative examples and modifications possible, and that the above examples are only illustrations of one or more examples. The scope, therefore, is only to be limited by the claims appended hereto.

What is claimed is:

1. A method comprising:

determining, via one or more computing devices, resource usage of an initial topology of a geographically distributed system that includes data stored at one or more initial locations and applications, that consume the data, being implemented at the one or more of initial locations;

determining, via the one or more computing devices, respective projected resource usage of one or more additional topologies of the geographically distributed system, the one or more additional topologies defining one or more respective locations, different from the one or more initial locations, where respective portions of one or more of the data and the applications are located; and in response to an additional topology, of the one or more additional topologies, having a respective projected resource usage that is less than the resource usage of the initial topology, controlling, via the one or more computing devices, a respective portion of one or more of the data and the applications to move to the one or more respective locations defined by the additional topology, wherein the respective projected resource usage of the one or more additional topologies includes:

a respective resource usage estimation that estimates respective resource usage of resources of the geographically distributed system for a respective additional topology;

a respective migration resource usage estimation that estimates respective resource usage to move the respective portions of one or more of the data and the applications from the one or more initial locations to the one or more respective locations, wherein the respective migration resource usage estimation comprises an estimation of one or more of bandwidth usage to move the respective portions, a transfer cost to move the respective portions, and a latency that occurs while moving the respective portions; and an adjustment factor to adjust the respective migration resource usage estimation, relative to the respective resource usage, the adjustment factor related to a time period to amortize transferring the respective portions to move to the one or more respective locations defined by the additional topology, and wherein a portion of the one or more additional topologies are constrained by one or more of: latency rules; data production rules; and location-specific rules.

2. The method of claim 1, further comprising:

prior to controlling the respective portion of one or more of the data and the applications to move to the one or more respective locations, providing a recommendation of the additional topology, and wherein controlling the respective portion to move occurs in response to receiving an acceptance of the additional topology.

3. The method of claim 1, further comprising determining that the additional topology has a minimum resource usage, relative to other additional topologies, of the one or more additional topologies, and the initial topology, the minimum resource usage determined from a combination of: the respective resource usage estimation; and the respective migration resource usage estimation combined with the adjustment factor.

4. The method of claim 1, further comprising selecting the additional topology using one or more of:

a gradient descent process; and an optimization algorithm for finding a local minimum of a differentiable function.

5. The method of claim 1, wherein the respective projected resource usage is determined with respect to cost thereof.

6. The method of claim 1, wherein determining the resource usage occurs via a resource usage engine that manages data writing and reading requests between the one or more initial locations.

7. A device comprising:

a communication interface; and a controller configured to:

determine resource usage of an initial topology of a geographically distributed system that includes data stored at one or more initial locations and applications, that consume the data, being implemented at the one or more of initial locations;

determine respective projected resource usage of one or more additional topologies of the geographically distributed system, the one or more additional topologies defining one or more respective locations, different from the one or more initial locations, where respective portions of one or more of the data and the applications are located; and in response to an additional topology, of the one or more additional topologies, having a respective projected resource usage that is less than the resource usage of the initial topology, control, via the communication interface, a respective portion of one or more of the data and the applications to move to the one or more respective locations defined by the additional topology, wherein the respective projected resource usage of the one or more additional topologies includes:

a respective resource usage estimation that estimates respective resource usage of resources of the geographically distributed system for a respective additional topology;

a respective migration resource usage estimation that estimates respective resource usage to move the respective portions of one or more of the data and the applications from the one or more initial locations to the one or more respective locations, wherein the respective migration resource usage estimation comprises an estimation of one or more of bandwidth usage to move the respective portions, a transfer cost to move the respective portions, and a latency that occurs while moving the respective portions; and an adjustment factor to adjust the respective migration resource usage estimation, relative to the respective resource usage, the adjustment factor related to a time period to amortize transferring the respective portions to move to the one or more respective locations defined by the additional topology, and wherein a portion of the one or more additional topologies are constrained by one or more of: latency rules; data production rules; and location-specific rules.

8. The device of claim 7, wherein the controller is further configured to:

prior to controlling the respective portion of one or more of the data and the applications to move to the one or more respective locations, provide a recommendation of the additional topology, and control the respective portion to move in response to receiving an acceptance of the additional topology.

9. The device of claim 7, wherein the controller is further configured to determine that the additional topology has a minimum resource usage, relative to other additional topologies, of the one or more additional topologies, and the initial topology, the minimum resource usage determined from a combination of: the respective resource usage estimation; and the respective migration resource usage estimation combined with the adjustment factor.

10. The device of claim 7, wherein the controller is further configured to select the additional topology using one or more of:

a gradient descent process; and an optimization algorithm for finding a local minimum of a differentiable function.

11. The device of claim 7, wherein the respective projected resource usage is determined with respect to cost thereof.

12. The device of claim 7, wherein the controller is further configured to determine the resource usage occurs via a resource usage engine that manages data writing and reading requests between the one or more initial locations.

13. A method comprising:

determining, via one or more computing devices, resource usage of an initial topology of a geographically distributed system that includes data stored at one or more initial locations and applications, that consume the data, being implemented at the one or more of initial locations;

determining, via the one or more computing devices, respective projected resource usage of one or more additional topologies of the geographically distributed system, the one or more additional topologies defining one or more respective locations, different from the one or more initial locations, where respective portions of one or more of the data and the applications are located; and in response to an additional topology, of the one or more additional topologies, having a respective projected resource usage that is less than the resource usage of the initial topology, controlling, via the one or more computing devices, a respective portion of one or more of the data and the applications to move to the one or more respective locations defined by the additional topology, wherein the respective projected resource usage of the one or more additional topologies includes:

a respective resource usage estimation that estimates respective resource usage of resources of the geographically distributed system for a respective additional topology;

a respective migration resource usage estimation that estimates respective resource usage to move the respective portions of one or more of the data and the applications from the one or more initial locations to the one or more respective locations, wherein the respective migration resource usage estimation comprises an estimation of one or more of bandwidth usage to move the respective portions, a transfer cost to move the respective portions, and a latency that occurs while moving the respective portions; and an adjustment factor to adjust the respective migration resource usage estimation, relative to the respective resource usage, the adjustment factor related to a time period to amortize transferring the respective portions to move to the one or more respective locations defined by the additional topology; and determining that the additional topology has a minimum resource usage, relative to other additional topologies, of the one or more additional topologies, and the initial topology, the minimum resource usage determined from a combination of: the respective resource usage estimation; and the respective migration resource usage estimation combined with the adjustment factor.

\* \* \* \* \*